D. E. McSherry.
Seeding Mach.
N° 86,026. Patented Jan. 19, 1869.
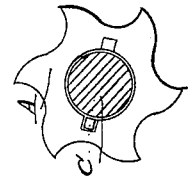
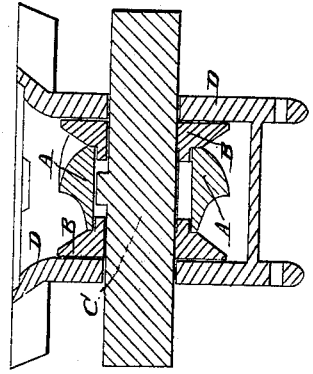
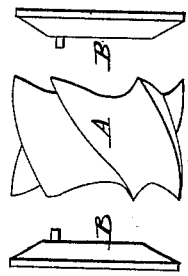
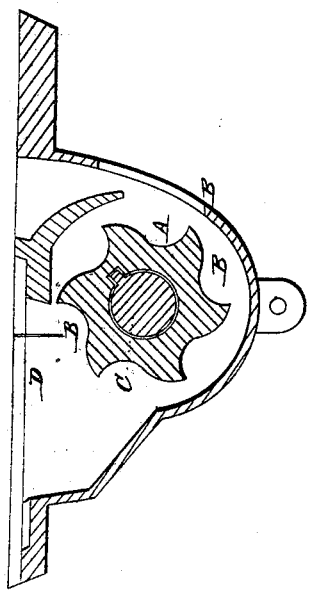
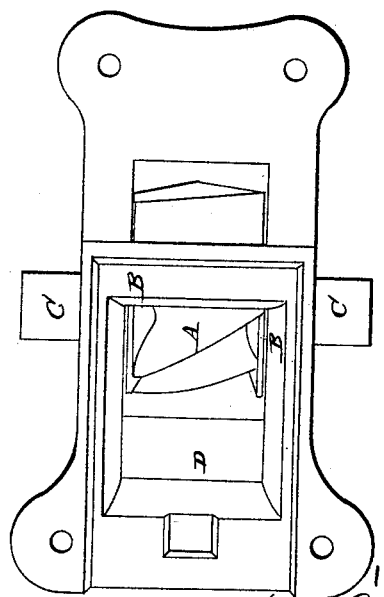
WITNESSES:
INVENTOR.

UNITED STATES PATENT OFFICE.

DANIEL E. McSHERRY, OF DAYTON, OHIO.

IMPROVEMENT IN SEEDING-MACHINES.

Specification forming part of Letters Patent No. 86,026, dated January 19, 1869.

*To all whom it may concern:*

Be it known that I, DANIEL E. McSHERRY, of Dayton, in the county of Montgomery and State of Ohio, have invented an Improvement in Seeding-Machines; and I do hereby declare that the following is a full, clear, and exact description thereof, reference being had to the accompanying drawings, making part of this specification, in which—

Figure 1 is a vertical section taken longitudinally through the center of my improved seeding device. Fig. 2 is a top view of the seed-box with seed-slide removed. Fig. 3 is a transverse section taken in a vertical plane through the center of the seed-box and feeder. Fig. 4 shows, in a side view and in detail, the feed-cylinder and washers. Fig. 5 is a transverse section through the feed-wheel.

Similar letters of reference indicate corresponding parts in the several figures.

This invention relates particularly to an improvement on wheat-drills; but it is applicable to all kinds of drill seeding-machines where the seeds are discharged from a seed-box by means of a rotating cylinder having spiral grooves formed in its periphery.

In the Letters Patent numbered 45,423 a spirally-grooved cylinder is described as being applied in the bottom of a seed-box, and provided on one end with a disk or washer, which was designed for preventing the sharp angles and edges from cutting and crushing the seed against the sides of the box.

The invention which forms the subject of this application is designed for preventing the seed from being broken or crushed in the seed-box on their way from the hopper to drill-tooth, by employing beveled-face disks or washers at the end of the spirally-grooved feed-wheel, said disks being fitted into corresponding recesses formed in the ends of the feed-wheel, and applied to the shaft of the latter, so as to rotate with it, as will be hereinafter described.

To enable others skilled in the art to understand my invention, I will describe its construction and operation.

The spirally-grooved feed-wheel A (shown in the drawings) is preferable to any other form of wheel or feeding device which can be used for equitably discharging seeds from a hopper into the drill-teeth; and the only objection which attended this form of feeder was the frequent crushing of the seeds getting between its ends and the sides of the seed-box. To remedy this objection effectually and in a very simple manner, this feed-wheel A is cast with depressions in its ends for receiving and having fitted snugly to said ends two washers, B B. The inner faces, or those faces which abut against the ends of said wheel, are beveled, as shown in the drawings, while their outer faces are flat, so that they shall run smoothly and fit closely to the sides of the seed-box, as shown in Figs. 2 and 3.

By thus constructing the disks or washers with beveled inside surfaces, it will be seen that the seeds will not find a lodgment where they will be liable to be crushed, and that the beveled faces will turn the seeds toward the middle of the length of the feed-wheel.

I prefer always to have both ends of the feed-wheel A protected or guarded by means of the beveled washers which I have described; but, if desirable, only one washer may be used, and applied at that end of the feed-wheel where the seeds would be most liable to be crushed.

In practice, the feed-wheel and washer or washers will be cast separately, and connected together upon their shaft C by means of lugs fitting into recesses, as shown in Fig. 3. I do not, however, confine myself to having the washers made separate from their feed-wheels, as these wheels may be cast with the flaring or beveled surfaces upon their ends.

The feed-wheel is applied to its shaft C by means of a key-tenon on this shaft fitting into a groove formed in said wheel.

The seed-box D and its attachments may be made in the usual well-known manner, and not form any part of my invention.

Having described my invention, what I claim as new, and desire to secure by Letters Patent, is—

A grooved feed-wheel which is constructed with outwardly-beveled flanges upon its end or ends, substantially as described.

DANIEL E. McSHERRY.

Witnesses:
 EDWARD BRENEMAN,
 JAMES TURNER.